(12) United States Patent
Chung et al.

(10) Patent No.: US 10,081,547 B2
(45) Date of Patent: Sep. 25, 2018

(54) ELECTRODE MATERIAL, ELECTRODE AND ELECTRICAL STORAGE DEVICE

(71) Applicants: JSR CORPORATION, Minato-ku (JP); JM ENERGY CORPORATION, Hokuto-shi (JP)

(72) Inventors: Kang Ko Chung, Minato-ku (JP); Ryo Tanaka, Minato-ku (JP); Takahiro Shimizu, Minato-ku (JP); Kouji Senoo, Minato-ku (JP); Satoshi Shimobaba, Minato-ku (JP); Yukio Hosaka, Minato-ku (JP); Fujio Sakurai, Minato-ku (JP); Masahiro Yamamoto, Hokuto (JP); Kenji Kojima, Hokuto (JP)

(73) Assignees: JSR CORPORATION, Minato-ku (JP); JM ENERGY CORPORATION, Hokuto-shi (JP)

( * ) Notice: Subject to any disclaimer, the term of this patent is extended or adjusted under 35 U.S.C. 154(b) by 0 days.

(21) Appl. No.: 14/828,961

(22) Filed: Aug. 18, 2015

(65) Prior Publication Data

US 2016/0060125 A1 Mar. 3, 2016

(30) Foreign Application Priority Data

Sep. 1, 2014 (JP) ................. 2014-176987

(51) Int. Cl.

| | | |
|---|---|---|
| *C01B 32/05* | (2017.01) | |
| *C01B 31/08* | (2006.01) | |
| *H01G 11/44* | (2013.01) | |
| *H01G 11/42* | (2013.01) | |
| *H01G 11/50* | (2013.01) | |
| *H01G 11/86* | (2013.01) | |
| *H01M 4/587* | (2010.01) | |
| *C01B 31/02* | (2006.01) | |
| *H01M 10/0525* | (2010.01) | |
| *H01G 11/04* | (2013.01) | |
| *H01G 11/38* | (2013.01) | |
| *H01G 11/24* | (2013.01) | |

(52) U.S. Cl.
CPC ............. *C01B 31/08* (2013.01); *C01B 31/02* (2013.01); *H01G 11/42* (2013.01); *H01G 11/44* (2013.01); *H01G 11/50* (2013.01); *H01G 11/86* (2013.01); *H01M 4/587* (2013.01); *C01P 2006/14* (2013.01); *C01P 2006/16* (2013.01); *C01P 2006/37* (2013.01); *H01G 11/04* (2013.01); *H01G 11/24* (2013.01); *H01G 11/38* (2013.01); *H01M 10/0525* (2013.01); *Y02E 60/13* (2013.01)

(58) Field of Classification Search
CPC ........ C01B 31/08; H01G 11/04; H01G 11/24; H01G 11/38; H01G 11/42; H01G 11/44; H01G 11/50; H01G 11/86; H01M 10/0525; H01M 4/587
See application file for complete search history.

(56) References Cited

U.S. PATENT DOCUMENTS

| | | | | |
|---|---|---|---|---|
| 4,896,249 A | * | 1/1990 | Endo | ........................ H01G 9/08 361/502 |
| 6,461,769 B1 | | 10/2002 | Ando et al. | |
| 6,740,454 B1 | | 5/2004 | Ando et al. | |
| 2006/0147799 A1 | * | 7/2006 | Hayashi | ................ H01M 4/133 429/231.8 |
| 2008/0220329 A1 | * | 9/2008 | Kojima | ................... C04B 35/83 429/188 |
| 2013/0309577 A1 | | 11/2013 | Hayashi et al. | |
| 2014/0227522 A1 | * | 8/2014 | Sasaki | ................... H01M 4/364 428/402 |
| 2015/0050562 A1 | * | 2/2015 | Abe | .................... H01M 10/052 429/332 |

FOREIGN PATENT DOCUMENTS

| | | | | | |
|---|---|---|---|---|---|
| CN | 102931407 | | * | 2/2013 | ............ H01M 4/583 |
| CN | 103190018 | A | | 7/2013 | |
| CN | 103814465 | A | | 5/2014 | |
| JP | 2001-229914 | | | 8/2001 | |
| JP | 2008-060479 | | * | 3/2008 | ............ H01G 9/058 |
| JP | 2009-246137 | | | 10/2009 | |
| JP | 2013-258392 | | | 12/2013 | |
| WO | WO 098/33227 | | | 7/1998 | |
| WO | WO 00/07255 | | | 2/2000 | |
| WO | WO 2013/141345 | A1 | | 9/2013 | |

OTHER PUBLICATIONS

Combined Chinese Office Action and Search Report dated Jan. 24, 2018 in Patent Application No. 201510543497.6 (with English language translation and English language translation of categories of cited documents).

* cited by examiner

*Primary Examiner* — Ula C Ruddock
*Assistant Examiner* — Ben Lewis
(74) *Attorney, Agent, or Firm* — Oblon, McClelland, Maier & Neustadt, L.L.P.

(57) ABSTRACT

The present invention relates to an electrode material, an electrode, an electrical storage device and a lithium-ion capacitor, and the electrode material includes a carbon material and reduces its weight at a temperature not more than 650° C. by 20% relative to the weight thereof before heating when thermogravimetric analysis is performed on the electrode material with a heating rate of 5° C./min in an air flow at a rate of 100 ml/min.

27 Claims, No Drawings

ELECTRODE MATERIAL, ELECTRODE AND ELECTRICAL STORAGE DEVICE

TECHNICAL FIELD

The present invention relates to an electrode material, an electrode and an electrical storage device, and more particularly to an electrode material used preferably for electrical storage devices and the like such as lithium-ion secondary battery, lithium-ion capacitor and the like; an electrode comprising the electrode material, and an electrical storage device comprising the electrode as a negative electrode.

BACKGROUND ART

Remarkable progress has occurred recently in miniaturization and weight reduction of electronic devices. Accordingly, greater demands have been placed on the reduction in size and weight of batteries used as a power supply to drive such electronic devices. To meet such demands for miniaturization and weight reduction, non-aqueous electrolyte secondary batteries represented by lithium-ion secondary batteries have been developed as electrical storage devices. Moreover, electric double-layer capacitors are known as electrical storage devices having excellent properties such as high output density and good cycle performance. Furthermore, lithium-ion capacitors based on a combination of principles of electrical storage in lithium-ion secondary batteries and electric double-layer capacitors are known as electrical storage devices that cope with applications requiring high energy density and high output properties.

Various excellent properties at a low temperature are required for such electrical storage devices. To comply with this demand, for example, the use of a negative electrode active material comprising a carbon material, in which macropores having volumes of 0.05-0.40 cc/g are included, has been proposed in Patent Literature 1.

CITATION LIST

Patent Literatures

[Patent Literature 1] JP-A-2013-258392

SUMMARY OF THE INVENTION

Technical Problem

In electrical storage devices using such a conventional active material as that described above, however, a large volume of gas generated by keeping the electrical storage devices charged has caused a problem.

Therefore, an object of the present invention is to provide an electrode material which has a low internal resistance at a low temperature and furthermore enables an electrical storage device to be manufactured, in which a smaller volume of gas is generated when the electrical storage device is kept charged.

Solution to Problem

The inventors studied intensively in view of the above circumstances and found that the above-described problem can be solved by using an electrode material which reduces its weight by 20% at a temperature equal to or less than a particular value when thermogravimetric analysis is performed on the electrode material, and thereby completed the present invention.

That is, the present invention provides an electrode material comprising a carbon material (hereinafter also referred to as "the present electrode material"), wherein a temperature at which the present electrode material reduces its weight by 20% relative to the weight thereof before heating is not more than 650° C. when thermogravimetric analysis is performed on the present electrode material with a heating rate of 5° C./min in an air flow at a rate of 100 ml/min.

Moreover, the present invention provides an electrode comprising the present electrode material and further provides an electrical storage device comprising the electrode as a negative electrode.

Advantageous Effects of Invention

The use of the present electrode material allows an electrical storage device to be obtained, which electrical storage device has a low internal resistance at a low temperature and furthermore generates a smaller volume of gas when it is kept charged. Therefore, the present electrode material is quite useful as an electrode material for electrical storage devices such as lithium-ion secondary battery, lithium-ion capacitor and the like.

DESCRIPTION OF EMBODIMENTS

Now, the present invention will be described in detail.
Electrode Materials

The electrode material of the present invention comprises a carbon material, wherein the temperature at which the electrode material reduces its weight by 20% relative to the weight thereof before heating (hereinafter also referred to as "20% weight-reducing temperature") is not more than 650° C. when thermogravimetric analysis is performed on the present electrode material with a heating rate of 5° C./min in an air flow at a rate of 100 ml/min. It is understood that the present electrode material has a surface layer more flammable than conventional electrode materials and this property of the surface layer provides desired effects.

The upper limit of the above-described 20% weight-reducing temperature is preferably 640° C. In cases where the internal resistance of an electrical storage device at a low temperature is required to be especially low, the upper limit of the 20% weight-reducing temperature is preferably 630° C. On the other hand, the lower limit of the above-described 20% weight-reducing temperature is preferably not less than 500° C., and particularly preferably not less than 550° C.

Moreover, in cases where the internal resistance of an electrical storage device at a low temperature is required to be especially low, the temperature at which the weight reduction ceases (hereinafter also referred to as "weight reduction-ceasing temperature") is preferably not more than 700° C., and particularly preferably in the range of 650-700° C. when thermogravimetric analysis is performed on the present electrode material in a range from 30 to 1000° C. with a heating rate of 5° C./min in an air flow at a rate of 100 ml/min.

The content of basic functional groups in the present electrode material is preferably in the range of 0.015-0.20 mmol/g, further preferably of 0.016-0.20 mmol/g, and particularly preferably of 0.017-0.20 mmol/g. When the content of basic functional groups is within such ranges, an electrical storage device having a low internal resistance at a low temperature can be obtained. Here, the term "the content of basic functional groups" in the present invention refers to a value determined by a method described in the following Examples.

The present electrode material is typically in particulate form and the 50% volume cumulative diameter D50 (hereinafter also referred to simply as "D50") is preferably from 0.1 to 50 μm, and particularly preferably from 1 to 30 μm. In cases where the D50 is too small, it can cause resultant electrical storage devices to have reduced cycle performance, lowered charging/discharging efficiencies, and decreased bulk density of the active material layer as described below, which leads to a decreased energy density. On the other hand, in cases where the D50 is too large, it can cause the electrical storage devices to have an increased internal resistance. In cases where the internal resistance of an electrical storage device at a low temperature is required to be especially low, the D50 is preferably from 1 to 10 μm, further preferably from 1 to 5 μm, and particularly preferably from 1 to 3 μm. D50 is measured by a laser diffraction/scattering method.

In the present electrode material, the volume of macropores having pore diameters of 50-400 nm is preferably 0.02-0.20 cc/g, and particularly preferably 0.03-0.10 cc/g. When the macropore volume is within such ranges, the desired effects can be enhanced further. In the present invention, the macropore volume means the volume of pores having pore diameters of 50-400 nm, which is determined by analyzing a nitrogen adsorption isotherm according to the DH (Dollimore Heal) method, the nitrogen adsorption isotherm obtained by the nitrogen adsorption method performed at a temperature of 77 K using the automatic specific surface area/pore size distribution analyzer BELSORP-mini II manufactured by BEL Japan, Inc.

In the present electrode material, the volume of mesopores having pore diameters of 2-50 nm is preferably 0.001-0.05 cc/g, and particularly preferably 0.005-0.05 cc/g. When the mesopore volume is within such ranges, the desired effects can be enhanced further. To obtain an electrical storage device which generates a particularly small volume of gas when it is kept charged, the mesopore volume is preferably in the range of 0.001-0.04 cc/g, and particularly preferably of 0.005-0.03 cc/g. In the present invention, the mesopore volume means the volume of pores having pore diameters of 2-50 nm, which is determined by analyzing a nitrogen adsorption isotherm according to the DH method, the nitrogen adsorption isotherm obtained by the nitrogen adsorption method performed at a temperature of 77 K using the automatic specific surface area/pore size distribution analyzer BELSORP-mini II manufactured by BEL Japan, Inc.

Moreover, the specific surface area of the present electrode material is preferably in the range of 1-50 $m^2/g$, and particularly preferably of 5-30 $m^2/g$. When the specific surface area is within such ranges, the desired effects can be enhanced further. To obtain an electrical storage device which generates a particularly small volume of gas when it is kept charged, the specific surface area is preferably in the range of 1-25 $m^2/g$, and particularly preferably of 5-20 $m^2/g$. The specific surface area is determined by the nitrogen adsorption method.

The present electrode material comprises a carbon material and the carbon material is preferably a composite carbon material containing two or more kinds of carbon materials (hereinafter also referred to simply as "composite carbon material"). The composite carbon material can be produced by an appropriate method and is preferably produced by mixing and kneading carbon material particles having a 20% weight-reducing temperature more than 650° C. together with a nitrogen-containing organic polymer to coat the particles with the organic polymer and subsequently carbonizing the organic polymer by calcination at 700 to 2000° C. in the presence of an inert gas. Moreover, the composite carbon material is also preferably produced by depositing the pyrolysate of a nitrogen-containing organic polymer onto the surface of carbon material particles having a 20% weight-reducing temperature more than 650° C.

The above-described composite carbon material is preferably a composite carbon material which contains a core-forming carbon material and a coating carbon material that coats at least a part of the core-forming carbon material. In this composite carbon material, the above-described carbon material particles is preferred as the core-forming carbon material and a material comprising the above-described nitrogen-containing organic polymer is preferred as a raw material for the coating carbon material.

In the composite carbon material, examples of the above-described core-forming carbon material can include, for example, soft carbon materials such as petroleum coke, coal pitch coke, polyvinyl chloride carbon and the like; hard carbon materials such as polyvinylidene chloride carbon, sugar carbon, cellulose carbon, phenolic resin carbon, charcoal and the like; graphitized materials prepared from the above-described soft carbon or hard carbon materials through a further heat treatment process; powdered materials prepared from carbon fiber materials; natural graphite materials, and artificial graphite materials.

The core-forming carbon material is preferably a graphite crystalline carbon material having a (002) interplanar spacing, d002, in the range of 0.335-0.338 nm, which is measured by the X-ray diffraction analysis, and particularly preferably a natural graphite material or artificial graphite material.

In the present invention, the core-forming carbon materials may be used singly, or two or more kinds of the core-forming carbon materials may be used.

The content of nitrogen element in the above-described nitrogen-containing organic polymer, which is determined when CHN elemental analysis is performed on the organic polymer under nitrogen gas atmosphere, is usually from 0.25 to 2% by mass, and preferably from 0.30 to 1% by mass, to the organic polymer. Examples of the organic polymer can include, for example, copolymers comprising N-substituted maleimide and styrene as copolymerization components, butadiene-acrylonitrile rubber (NBR), and polyacrylonitrile.

The use of the above-described organic polymer allows the present electrode material having desired structure, properties and effects to be obtained easily.

The organic polymers may be used singly, or two or more kinds of the organic polymers may be used.

The amount of the organic polymer to be used, which varies depending on its type, is preferably from 30 to 500 parts by mass, and particularly preferably from 60 to 400 parts by mass, to 100 parts by mass of the core-forming carbon material. When the amount of the organic polymer to be used is within the above-described ranges, an electrical storage device having a low internal resistance at a low temperature can be obtained.

The use of the above-described organic polymer in an amount within the above-described ranges allows the present electrode material having desired structure, properties and effects to be obtained easily.

Moreover, as a coating carbon material, carbon blacks such as acetylene black, ketjen black, furnace black and the like; carbon fibers such as polyacrylonitrile carbon fiber, pitch carbon fiber, vapor grown carbon fiber and the like, and the like may also be used in combination with the above-described organic polymer.

In cases where a carbon black or carbon fiber (hereinafter also referred to as "carbon black or the like") is used in combination as a coating carbon material, the used amount of the carbon black or the like is preferably not more than 50% by mass, further preferably not more than 30% by mass, and particularly preferably not more than 20% by mass, to the core-forming carbon material. Moreover, the blend ratio of the carbon black or the like and the above-described organic polymer (the mass of the carbon black or the like:the mass of the organic polymer) is preferably from 50:50 to 0:100.

When the above-described carbon material particles and organic polymer are mixed and kneaded, melt blending using a machine, such as kneader, twin screw extruder and the like is preferred. When the melt blending is performed, a plasticizer may be used according to the type of the organic polymer to be used. Examples of the plasticizer can include known plasticizers such as phthalate plasticizers, fatty acid plasticizers, phosphate plasticizers, epoxy plasticizers, chlorinated paraffins and the like.

For carbonization of the above-described organic polymer, the organic polymer is preferably calcined in the presence of an inert gas such as nitrogen gas at a temperature ranging from 700 to 2000° C., and particularly preferably at a temperature ranging from 800 to 1500° C. Moreover, the organic polymer before this calcination may be made infusible by being heated to a temperature ranging from 100 to 500° C. under oxygen-containing atmosphere such as air, which allows the yield of carbon residue after the calcination to increase. By producing a composite carbon material in such a manner, an excellent electrode material with desired properties can be obtained.

Additionally, a step of pulverizing the obtained material is preferably included after the above-described carbonization or heating to give the present electrode material having a D50 within the above-described ranges.

The present electrode material may contain lithium-storage components other than carbon by, for example, allowing the surface of pores of the core-forming carbon material to carry particles of metals such as silicon and tin.

The present electrode material is obtainable as described above and the use of the present electrode material as an electrode active material allows an electrical storage device to be obtained, which electrical storage device has a low internal resistance at a low temperature and furthermore generates a smaller volume of gas when kept charged. Because the desired effects are more remarkably achieved in the following articles, the present electrode material is preferably used as a negative electrode material for electrical storage devices utilizing insertion/extraction of lithium ions, and particularly preferably used as a negative electrode material for lithium-ion capacitors. It is understood that the present electrode material is also useful as a catalyst which composes electrodes for fuel cells as well as those for electrical storage devices.

Electrodes

The electrode of the present invention contains the present electrode material and usually comprises an active material layer formed on a current collector, which active material layer contains the present electrode material and binder and the like. Typically, a slurry containing the present electrode material and binder and the like is prepared and the active material layer can be produced by applying and drying the slurry on the current collector.

The electrode of the present invention is preferably a negative electrode for electrical storage devices utilizing insertion/extraction of lithium ions, and particularly preferably a negative electrode for lithium-ion capacitors and uses the present electrode material as a negative electrode active material.

The content of the present electrode material in the entire part of the above-described active material layer is preferably from 50 to 90% by mass.

In the electrode of the present invention, the present electrode materials may be used singly, or two or more kinds of the present electrode materials may be used.

Aluminum, stainless steel and the like are preferable as a material for the above-described current collector in cases where the electrode of the present invention is a positive electrode, while copper, nickel, stainless steel and the like are preferable in cases where the electrode of the present invention is a negative electrode. The thickness of the current collector, whether in a positive or negative electrode, is usually in the range of 10 to 50 μm.

Moreover, in cases where the electrode of the present invention is an electrode used for lithium-ion capacitors, the current collectors for positive and negative electrodes preferably have through-holes extending between the front and back surfaces and the open area ratio of such collectors is preferably in the range of 10 to 70%. As a current collector having such through-holes, for example, expanded metals, punched metals, and porous metal foils having through-holes formed by etching can be used.

In the electrode of the present invention, examples of the above-described binder can include, for example, rubber binders such as styrene butadiene rubber (SBR), NBR and the like; fluorine resins such as polytetrafluoroethylene, polyvinylidene fluoride and the like; polypropylene, polyethylene, and additionally such fluorine-modified (meth) acrylic binders as those disclosed in JP-A-2009-246137.

The amount of the binder to be used is not particularly limited but is preferably from 1 to 20% by mass, and particularly preferably from 2 to 10% by mass relative to the present electrode material.

The binders may be used singly, or two or more kinds of the binders may be used.

The above-described active material layer may further contain a conducting agent such as carbon black, graphite, metal powder and the like; a thickening agent such as carboxymethyl cellulose, sodium or ammonium salt thereof, methyl cellulose, hydroxymethyl cellulose, ethyl cellulose, hydroxypropyl cellulose, polyvinyl alcohol, oxidized starch, phosphorylated starch, or casein; and the like.

The thickness of the above-described active material layer is not particularly limited but is usually from 5 to 500 μm, preferably from 10 to 200 μm, and particularly preferably from 10 to 100 μm.

Moreover, the density of the above-described active material layer is preferably in the range of 1.50 to 2.00 g/cc and particularly preferably of 1.60 to 1.90 g/cc in cases where the electrode of the present invention is used in lithium-ion secondary batteries, while it is preferably in the range of 0.50 to 1.50 g/cc and particularly preferably of 0.70 to 1.20 g/cc in cases where the electrode of the present invention is used in lithium-ion capacitors. When the density of the active material layer is within such ranges, the excellent balance between the electrolytic solution retaining property and the contact resistance between the present electrode materials in the active material layer allows high capacity electrical storage devices having a low resistance to be provided.

Electrical Storage Devices

The electrical storage device of the present invention comprises the electrode of the present invention as a negative electrode. Examples of the electrical storage device can include, for example, non-aqueous electrolyte secondary batteries, electric double-layer capacitors, and lithium-ion capacitors. The electrical storage device of the present invention is preferably an electrical storage device utilizing insertion/extraction of lithium ions, and particularly preferably a lithium-ion capacitor.

The electrical storage device of the present invention preferably comprises at least a positive electrode and an electrolyte in addition to the electrode of the present invention used as a negative electrode. The configuration and the production method of the electrode of the present invention used as a negative electrode are as described in the section "Electrodes" above.

In the electrical storage device of the present invention, the basic configuration and the production method of the positive electrode is the same as the configuration and the production method described in the section "Electrodes" above, except that a positive active material below is used instead of the present electrode material.

In cases where the electrical storage device of the present invention is a lithium-ion secondary battery, examples of the positive active material to be used can include, for example, lithium-transition metal composite oxides such as lithium cobalt oxide, lithium nickel oxide, lithium manganese oxide and the like; transition metal oxides such as manganese dioxide, and carbonaceous materials such as graphite fluoride. On the other hand, in cases where the electrical storage device of the present invention is a lithium-ion capacitor, examples of the positive active material to be used can include, for example, activated carbon and polyacene materials. These positive active materials may be used singly, or two or more kinds of the positive active materials may be used.

In the electrical storage device of the present invention, the above-described electrolyte is usually used as an electrolytic solution in which the electrolyte is dissolved in a solvent. The electrolyte is preferably the one which can generate lithium ions and specific examples of the electrolyte can include $LiClO_4$, $LiAsF_6$, $LiBF_4$, $LiPF_6$, $LiN(C_2F_5SO_2)_2$, $LiN(CF_3SO_2)_2$, $LiN(FSO_2)_2$ and the like. These electrolytes may be used singly, or two or more kinds of the electrolytes may be used.

The solvent for dissolving the electrolyte is preferably an aprotic organic solvent and specific examples of the solvent can include ethylene carbonate, propylene carbonate, butylene carbonate, 1-fluoroethylene carbonate, 1-(trifluoromethyl)ethylene carbonate, dimethyl carbonate, diethyl carbonate, methyl ethyl carbonate, γ-butyrolactone, acetonitrile, dimethoxy ethane, tetrahydrofuran, dioxolane, methylene chloride, sulfolane and the like. These solvents may be used singly, or two or more kinds of the solvents may be used.

In the present invention, at least ethylene carbonate and propylene carbonate are preferably used and at least ethylene carbonate, propylene carbonate and diethyl carbonate are more preferably used as the solvent in terms of their ability to enhance the desired effects.

The concentration of the electrolyte in the electrolytic solution is preferably not less than 0.1 mol/L and more preferably in the range of 0.5 to 1.5 mol/L to reduce the internal resistance by the electrolytic solution. Moreover, the electrolytic solution may contain additives such as vinylene carbonate, vinyl ethylene carbonate, succinic anhydride, maleic anhydride, propane sultone, diethyl sulfone and the like.

Although the electrolyte is usually prepared in a liquid form and used as described above, the electrolyte in a gel or solid form may be used to prevent liquid leakage.

In cases where the electrolyte in the form of electrolytic solution is used, a separator is usually provided between the positive and negative electrodes to prevent physical contact between the positive and negative electrodes. Examples of the separator can include, for example, non-woven fabrics or porous films made of cellulose rayon, polyethylene, polypropylene, polyamide, polyester, polyimide and the like.

Examples of the configuration of the electrical storage device can include, for example, laminate type cells in which an exterior film enclose a laminated body comprising three or more layers of units laminated one another and each unit is formed by laminating plate-shaped positive and negative electrodes with a layer of a separator inserted between them, roll type cells in which a polygonal or cylindrical container houses a laminated body formed by winding belt-shaped positive and negative electrodes with a layer of separator inserted between them, and the like.

In cases where the electrical storage device of the present invention is a lithium-ion capacitor, the negative electrode and/or positive electrode is preferably pre-doped with lithium ions such that the potential of the positive electrode is not more than 2.0 V (vs. Li/Li$^+$) after the positive and negative electrodes are short-circuited. Methods for lithium ion pre-doping are disclosed in, for example, WO1998/033227, WO2000/007255 and the like.

EXAMPLES

Now, embodiments of the present invention will be described more specifically by way of Examples. However, the present invention is not intended to be limited to the Examples below.

In the Examples and Comparative Examples below, properties of electrode materials were measured by methods described below.

<20% Weight-Reducing Temperature and Weight Reduction-Ceasing Temperature>

The 20% weight-reducing temperature and weight reduction-ceasing temperature of an electrode material, which is a substance under test, were measured by performing a thermogravimetric analysis of the substance using TG-DTA 2000 SR manufactured by Erich NETZSCH GmbH & Co. Holding KG. The electrode material was precisely weighed in the range of 10±1 mg and the electrode material was subjected to the analysis in a range from 30 to 1000° C. with a heating rate of 5° C./min in an air-supplying rate of 100 ml/min. The temperature at which the electrode material reduced its weight by 20% relative to the weight thereof before heating was identified during the analysis and considered to be the 20% weight-reducing temperature of the electrode material. Moreover, the temperature at which the weight reduction was not observed any more in spite of heating was considered to be the weight reduction-ceasing temperature of the electrode material. As a reference, α-Alumina was used. An air supply with a controlled humidity of not more than 30% was used.

<Measurement of the Content of Basic Functional Groups>

A precisely weighed about 1-g electrode material was put into a 50-ml conical flask and 10.0 ml of 0.05 N hydrochloric acid (manufactured by Wako Pure Chemical Industries, Ltd.) was collected with a whole pipette and added thereto.

After adding three drops of a surfactant (CHARMY Green, manufactured by Lion Co.) thereto, a stopper was attached to the flask and the junction between the flask and the stopper was sealed with a sealing tape. The electrode material therein was sonicated for 20 minutes in an ultrasonic cleaner set at 25° C. (ASU-10, manufactured by AS ONE Co., intensity: High) to allow the electrode material to be well dispersed. Then, the dispersion was filtered through filter paper (Whatman Grade 42 Filtration Paper, diameter: 110 mm, manufactured by GE Healthcare UK, Ltd.) and 2.0 ml of the filtrate was collected with a whole pipette and put into a 100-ml conical beaker, followed by adding three drops of an ethanol solution of methyl red and methylene blue (manufactured by Wako Pure Chemical Industries, Ltd.) as an indicator thereto with a dropping pipette. The content of the conical beaker was titrated by adding 0.05 N NaOH aqueous solution (manufactured by Wako Pure Chemical Industries, Ltd.) dropwise while stirring with a magnetic stirrer and determining the neutralization point based on the change of the color (from purple to green) due to the indicator. Moreover, a blank sample composed of 0.05 N hydrochloric acid without the addition of the electrode material was titrated in the same manner and the content of basic functional groups was quantified from the difference in titer between the blank sample and the sample containing the electrode material.

<Measurements of Macropore Volume and Mesopore Volume>

The macropore volume and mesopore volume were determined by analyzing a nitrogen adsorption isotherm according to the DH method, the nitrogen adsorption isotherm obtained by the nitrogen adsorption method performed at a temperature of 77 K using the automatic specific surface area/pore size distribution analyzer BELSORP-mini II manufactured by BEL Japan, Inc. During the analysis, the measurement mode was "high-precision mode" and a cell having a volume of about 1.8 $cm^3$, which is a standard cell, was used as a sample cell. Moreover, the sample was weighed using an electrical balance to a $10^{-4}$ g order such that the amount of the sample was within the range from 0.1500 to 0.2500 g.

An electrode material dried under vacuum at 200° C. for two hours was used as a sample used in these measurements.

<Measurement of Specific Surface Area>

The specific surface area was determined by analyzing a nitrogen adsorption isotherm according to the BET method, the nitrogen adsorption isotherm obtained by the nitrogen adsorption method performed at a temperature of 77 K using the automatic specific surface area/pore size distribution analyzer BELSORP-mini II manufactured by BEL Japan, Inc. During the analysis, measurement points in the range of a relative pressure ($P/P_0$) from 0.05 to 0.25 were used. Moreover, the sample was weighed using an electrical balance to a $10^{-4}$ g order such that the amount of the sample was within the range from 0.1500 to 0.2500 g.

An electrode material dried under vacuum at 200° C. for two hours was used as a sample used in this measurement.

<Measurement of D50>

The D50 was measured using the laser diffraction/scattering particle size distribution analyzer LA-950 V2 manufactured by HORIBA Ltd.

Manufacturing of Electrode Materials

Example 1

By using a kneader, 100 parts by mass of pulverized artificial graphite manufactured by TIMCAL Japan K.K. (D50: 1.5 μm, interplanar spacing (d002) measured by X-ray diffraction: 0.3356 nm, specific surface area: 35 $m^2$/g, 20% weight-reducing temperature: 683° C.) as a core-forming carbon material and 100 parts by mass of a copolymer comprising N-phenylmaleimide and styrene as copolymerization components (the content of nitrogen element determined by CHN elemental analysis under nitrogen gas atmosphere: 0.38% by mass) were mixed and kneaded for one hour while heating at 250° C. The obtained artificial graphite/resin composite material was pulverized with a stamp mill and then calcined at 1000° C. under nitrogen atmosphere for two hours to carbonize the composite material, followed by pulverization with a ball mill and screening with a sieve having an opening of 1 mm. The material which passed the sieve was pulverized with a jet mill to obtain an electrode material. The results of the evaluations of the obtained electrode material are shown in Table 1.

Example 2

An electrode material was manufactured in the same manner as in Example 1, except that NBR (N230S, manufactured by JSR Co., the content of nitrogen element determined by CHN elemental analysis under nitrogen gas atmosphere: 0.59% by mass) was used in place of the copolymer comprising N-phenylmaleimide and styrene as copolymerization components in Example 1 and the temperature of the kneader was changed to 90° C. The results of the evaluations of the obtained electrode material are shown in Table 1.

Example 3

An electrode material was manufactured in the same manner as in Example 1, except that 30 parts by mass of polyacrylonitrile (the content of nitrogen element determined by CHN elemental analysis under nitrogen gas atmosphere: 0.70% by mass) was used in place of 100 parts by mass of the copolymer comprising N-phenylmaleimide and styrene as copolymerization components in Example 1. The results of the evaluations of the obtained electrode material are shown in Table 1.

Comparative Example 1

An electrode material was manufactured in the same manner as in Example 1, except that 30 parts by mass of a styrene-acrylonitrile copolymer having an acrylonitrile content of about 30% by mass (manufactured by Techno Polymer Co., Ltd., the content of nitrogen element determined by CHN elemental analysis under nitrogen gas atmosphere: 0.23% by mass) was used in place of 100 parts by mass of the copolymer comprising N-phenylmaleimide and styrene as copolymerization components in Example 1. The results of the evaluations of the obtained electrode material are shown in Table 1.

Comparative Example 2

An electrode material was manufactured in the same manner as in Example 1, except that 30 parts by mass of a commercially available pitch was used in place of 100 parts by mass of the copolymer comprising N-phenylmaleimide and styrene as copolymerization components in Example 1 and the temperature of the kneader was changed to 100° C. The results of the evaluations of the obtained electrode material are shown in Table 1.

<Manufacturing of Electrodes and Electrical Storage Devices>
(1) Manufacturing of Negative Electrodes By using a high-speed mixer, 88 parts by mass of each electrode material obtained in the above-described Examples and Comparative Examples, 5 parts by mass of carbon black as a conducting agent, and 3 parts by mass of carboxymethyl cellulose as a thickening agent were mixed at a circumferential speed of 25 m/s for two minutes. 4 parts by mass of an SBR binder and water were further added thereto and agitated by using a mixer with defoaming function to produce a negative-electrode slurry. Each of the obtained negative-electrode slurries was applied using an automatic applicator onto a sheet of a 20 μm thick perforated copper foil such that an uncoated area was left. Each of the copper foils was dried at 170° C. using a radiant heat dryer to manufacture a negative electrode with a negative electrode active material layer formed on the copper foil. Two pieces of electrodes were punched out from each of the obtained negative electrodes such that each piece contained a coated area of 40×26 mm$^2$ and an uncoated area of 10×5 mm$^2$, which uncoated area functions as a tub part (connection terminal), and dried under vacuum at 200° C. for 12 hours to make a working electrode with one of the electrodes and a counter electrode with the other.

(2) Manufacturing of an Anode Half-Cell

A sheet of a 200 μm thick lithium foil was cut to a piece of 37×24 mm$^2$ and the piece of the lithium foil was put onto a 20 μm thick perforated copper foil cut into a size of 49×26 mm$^2$ such that the copper foil left a margin of 1 mm width on the top side, a margin of 1 mm width on the left side, a margin of 1 mm width on the right side, and a margin of 11 mm width on the bottom side around the lithium foil. The bottom margin of the copper foil in a size of 11×26 mm$^2$ was cut to a predetermined shape to produce a reference electrode having a tab part. A 5 mm wide Ni lead tab was fused using an ultrasonic welding machine to each of the working electrodes, the counter electrodes, and the reference electrodes.

Four pieces of cellulose separators in a size of 28×41 mm$^2$ (hereinafter also referred to as "small separator") and one piece of a cellulose separator in a size of 41×70 mm$^2$ (hereinafter also referred to as "large separator") were prepared. Subsequently, the working electrode, two pieces of the small separators, the counter electrode, two pieces of the small separators, and the reference electrode were laminated in this order. They were enclosed with the large separator and were secured with a polyimide tape to obtain a laminated body, such that the tab parts of the three electrodes extended outward from both sides of the laminated body. This laminated body was placed into a housing part of a commercially available exterior film such that the tab parts of the three electrodes protruded from the edges of the exterior film and another exterior film was placed on the former one. After three sides of the circumferential edge of the exterior films were heat-sealed, the laminated body was dried under vacuum at 120° C. for 12 hours. An electrolytic solution (1.2 M solution of LiPF$_6$ in a mixture of ethylene carbonate/diethyl carbonate/propylene carbonate=3/4/1 (volume ratio)) was injected thereto from the unfused side and subsequently the unfused side was heat-sealed to produce an anode half-cell.

<Measurement of Impedance>

Each of the anode half-cells was charged at 20 mA of constant current at 60° C. up to 0 V using the TOSCAT system (a charge/discharge state evaluating device) manufactured by Toyo System Co., Ltd. Then, the AC impedance was measured at −30° C. using the VMP3 manufactured by Bio-Logic SAS and the charge transfer resistance was obtained from the arc in the Nyquist plot. The results of the evaluation are shown in Table 1. In cases where this value is not more than 12.0 ohms, the internal resistance at a low temperature is low and thus considered to be excellent.

<Measurement of Generated Gas Volume>

The initial cell volume of each of the above-described anode half-cells was determined by submerging the cell in a water tank on an electrical balance and measuring the change in weight of the water tank. Then, in a thermostatic chamber kept at 70° C., the anode half-cell was maintained at 33 mV for 94 hours by using the VMP3 manufactured by Bio-Logic SAS and then the cell volume was determined in the same manner. From the difference between the initial cell volume and the latter cell volume, the volume of gas (float gas), which was generated while the cell was maintained at 33 mV for 94 hours, was determined. The results of the evaluation are shown in Table 1. Each result of the evaluation is expressed as a relative value to the volume of the gas generated in Comparative Example 1, which corresponds to a relative value of 100. In cases where this relative value is not more than 90, the volume of generated gas is small and thus considered to be excellent.

TABLE 1

|  | Example 1 | Example 2 | Example 3 | Comparative Example 1 | Comparative Example 2 |
|---|---|---|---|---|---|
| 20% weight-reducing temperature (° C.) | 615 | 570 | 640 | 660 | 655 |
| Weight reduction-ceasing temperature (° C.) | 675 | 660 | 755 | 740 | 730 |
| Content of basic functional groups (mmol/g) | 0.024 | 0.019 | 0.030 | 0.025 | 0.010 |
| Macropore volume (cc/g) | 0.066 | 0.048 | 0.042 | 0.067 | 0.065 |
| Mesopore volume (cc/g) | 0.034 | 0.017 | 0.030 | 0.034 | 0.025 |
| Specific surface area (m$^2$/g) | 22.3 | 12.1 | 20.1 | 21.4 | 20.5 |
| D50 (μm) | 1.9 | 2.0 | 2.0 | 1.9 | 2.0 |
| Charge transfer resistance (ohms) | 10.3 | 11.8 | 11.9 | 11.9 | 12.8 |
| Volume of float gas (relative value) | 88 | 75 | 80 | 100 | 88 |

<Application Example as a Lithium-Ion Capacitor>

Lithium-ion capacitors were produced in the same manner as in the Examples disclosed in JP-A-2013-258392, except that each of the electrode materials obtained in the above-described Examples and Comparative Examples was used as a negative electrode active material. In cases where each of the electrode materials obtained in the above-described Examples 1 to 3 was used as a negative electrode active material, it was found that a lithium-ion capacitor, which had a high energy density and a high output density even at −30° C. and showed no expansion of the cell when kept charged, was obtained. On the other hand, the electrode material obtained in Comparative Example 1 was used as a negative electrode active material, some level of expansion was observed in the cell when kept charged. Moreover, in cases where the electrode material obtained in Comparative Example 2 was used as a negative electrode active material, the internal resistance at −30° C. was high and the energy and output densities at the same temperature were low.

What is claimed is:

1. An electrode material comprising a carbon material,
wherein a temperature at which the electrode material reduces a weight thereof by 20% relative to the weight thereof before heating is not more than 650° C. when thermogravimetric analysis is performed on the electrode material with a heating rate of 5° C./min in an air flow at a rate of 100 ml/min,
wherein the carbon material is a composite carbon material which comprises a core-forming carbon material and a coating carbon material, and the composite carbon material is a calcined product of a mixture which comprises carbon material particles and a nitrogen-containing organic polymer,
wherein a content of nitrogen element in the nitrogen-containing organic polymer is from 0.25 to 2% by mass, and
wherein a specific surface area of the electrode material is from 1 to 50 $m^2/g$.

2. The electrode material according to claim 1, wherein the temperature at which the electrode material reduces the weight thereof by 20% is a temperature not less than 500° C.

3. The electrode material according to claim 1, wherein the electrode material comprises basic functional groups, and a content of the basic functional groups is in the range of 0.015-0.20 mmol/g.

4. The electrode material according to claim 1, wherein a volume of macropores having pore diameters of 50-400 nm in the electrode material is 0.02-0.20 cc/g.

5. The electrode material according to claim 1, wherein a volume of mesopores having pore diameters of 2-50 nm in the electrode material is 0.001-0.05 cc/g.

6. The electrode material according to claim 1, wherein a temperature at which the weight reduction ceases is not more than 700° C. when thermogravimetric analysis is performed on the electrode material in a range from 30 to 1000° C. with a heating rate of 5° C./min in an air flow at a rate of 100 ml/min.

7. The electrode material according to claim 6, wherein the temperature at which the weight reduction ceases is not less than 650° C.

8. An electrode comprising the electrode material according to claim 1.

9. An electrical storage device comprising a negative electrode which comprises the electrode according to claim 8.

10. A lithium-ion capacitor comprising the electrode material according to claim 1.

11. The electrode material according to claim 1, wherein a temperature at which the carbon material particles reduce a weight thereof by 20% relative to the weight thereof before heating is more than 650° C. when thermogravimetric analysis is performed on the carbon material particles with a heating rate of 5° C./min in an air flow at a rate of 100 ml/min.

12. The electrode material according to claim 1, wherein a temperature of the calcination of the mixture is in a range from 700 to 2000° C.

13. The electrode material according to claim 1, wherein the core-forming carbon material is a graphite crystalline carbon material having a (002) interplanar spacing in a range of from 0.335 to 0.338 nm.

14. The electrode material according to claim 1, wherein the mixture further comprises carbon black or carbon fibers.

15. The electrode material according to claim 1, wherein a temperature at which the electrode material reduces the weight thereof by 20% relative to the weight thereof before heating is not more than 630° C.

16. The electrode material according to claim 1, wherein the temperature at which the electrode material reduces the weight thereof by 20% is a temperature not less than 550° C.

17. The electrode material according to claim 1, wherein the specific surface area of the electrode material is from 5 to 30 $m^2/g$.

18. An electrode material comprising a carbon material,
wherein a temperature at which the electrode material reduces a weight thereof by 20% relative to the weight thereof before heating is not more than 650° C. when thermogravimetric analysis is performed on the electrode material with a heating rate of 5° C./min in an air flow at a rate of 100 ml/min,
wherein the carbon material is a composite carbon material which comprises a core-forming carbon material and a coating carbon material, and the composite carbon material is a calcined product of a mixture which comprises carbon material particles and a nitrogen-containing organic polymer,
wherein an amount of the nitrogen-containing organic polymer in the mixture is from 30 to 500 parts by mass with respect to 100 parts by mass of the core-forming carbon material, and
wherein a specific surface area of the electrode material is from 1 to 50 $m^2/g$.

19. The electrode material according to claim 18, wherein the amount of the nitrogen-containing organic polymer in the mixture is from 60 to 400 parts by mass with respect to 100 parts by mass of the core-forming carbon material.

20. The electrode material according to claim 18, wherein the electrode material comprises basic functional groups, and a content of the basic functional groups is in the range of 0.015-0.20 mmol/g.

21. The electrode material according to claim 18, wherein a volume of macropores having pore diameters of 50-400 nm in the electrode material is 0.02-0.20 cc/g.

22. The electrode material according to claim 18, wherein a volume of mesopores having pore diameters of 2-50 nm in the electrode material is 0.001-0.05 cc/g.

23. The electrode material according to claim 18, wherein a temperature at which the weight reduction ceases is not more than 700° C. when thermogravimetric analysis is performed on the electrode material in a range from 30 to 1000° C. with a heating rate of 5° C./min in an air flow at a rate of 100 ml/min.

24. An electrode comprising the electrode material according to claim 18.

25. An electrical storage device comprising a negative electrode which comprises the electrode according to claim 24.

26. The electrode material according to claim 18, wherein a content of nitrogen element in the nitrogen-containing organic polymer is from 0.25 to 2% by mass.

27. The electrode material according to claim 18, wherein the specific surface area of the electrode material is from 5 to 30 $m^2/g$.

* * * * *